Patented Mar. 31, 1925.

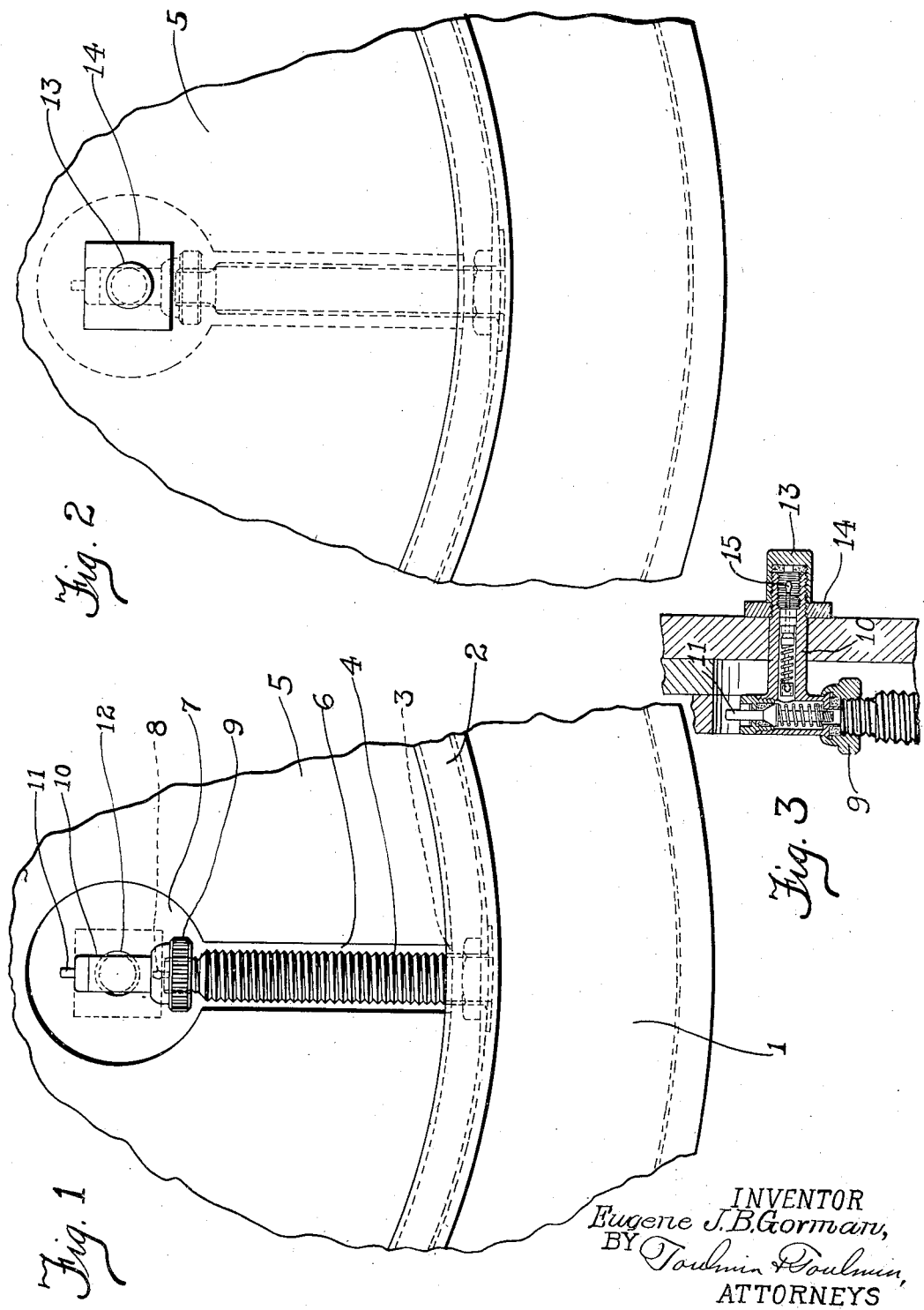

1,531,552

UNITED STATES PATENT OFFICE.

EUGENE J. B. GORMAN, OF DAYTON, OHIO, ASSIGNOR, BY DIRECT AND MESNE ASSIGNMENTS, TO A. SCHRADER'S SON, INCORPORATED, OF BROOKLYN, NEW YORK, A CORPORATION OF NEW YORK.

VALVE ARRANGEMENT FOR DISK WHEELS.

Application filed March 15, 1920. Serial No. 365,710.

*To all whom it may concern:*

Be it known that I, EUGENE J. B. GORMAN, a citizen of the United States, residing at Dayton, in the county of Montgomery and State of Ohio, have invented certain new and useful Improvements in Valve Arrangements for Disk Wheels, of which the following is a specification, reference being had therein to the accompanying drawing.

My invention relates to an improved valve arrangement for pneumatic tires mounted on automotive wheels.

My invention has particular reference to that type of automotive equipment known as disk wheels, of whatever material such wheels may be constructed. According to the present practice the valve stem of the pneumatic tire is located on the side of the disk wheel adjacent the car so that the exterior of the wheel may be left perfectly clear and free of any obstruction to enhance its appearance. This results in very great inconvenience when it becomes necessary to inflate the tire or to remove it from the disk wheel. When it is necessary to inflate the tire according to the present arrangement the air hose must be conveyed inside the wheel to an inaccessible location under conditions of mud, dust and grease.

It is my object to maintain the advantages of the disk wheel, yet to obviate this great disadvantage by providing a means of inflating the tire from the exterior of the wheel, still preserving its appearance.

It is an additional object of my invention to maintain the means for connecting the air hose to the tire valve in its proper location in case it is necessary to remove the tire with its accompanying valve entirely from the wheel so that this particular means will not become lost.

It is an additional object of my invention to provide, in one of its embodiments, a plurality of valves which shall perfectly insure against the leaking of the valve of the tire.

It is another object of my invention to present a dust-proof and highly ornamental and attractive connection for the air hose on the exterior of the wheel so as not to detract from its appearance.

It is another object of my invention to maintain the valve of the tire in its proper relative position with respect to the wheel and the co-operating mechanism of this invention during the co-operation of the component parts in their relative location, so that there will be no undue movement, no rattling and no wear due to friction of one part upon the other.

This invention applies not only to disk wheels, but to any form of equipment where it may be desired to conduct a gas or liquid from one side of such a structure to another. My invention also comprehends not only the employment of disk wheels, but the employment of it on the sides of wheels of other characters where it may be desired to hide the valve mechanism by locating it on the side of the wheel adjacent to the automobile or other automotive equipment.

In the accompanying drawings:—

Fig. 1 is a portion of a disk wheel and the tire mounted thereon, viewed from the valve side of the wheel next to the car; and, Fig. 2, is an exterior view looking at the wheel from the outside of the car on which the wheel is mounted with the valve mechanism in dotted lines; and, Fig. 3, is a detail of the valve connection between the inner and outer faces of the wheel.

Referring to the views in the drawing, similar numerals refer to similar parts in the respective views.

The disk wheel 5 has mounted on it the usual rim 2, carrying the tire 1.

The tire has projecting through the rim 2 the valve stem 4 in which is located at its upper end the valve member 8. In order to provide an adequate space for the valve stem 4 projecting through the aperture 3 in the rim 2, a slot 6 is cut in the wheel 5. The upper end of the valve stem 4 extends into an expanded area which is a depression below the general surface of the wheel and is an expansion of slot 6. Centrally located in this depressed or expanded area 7 is an aperture 12. Threaded on top of the valve stem 4 is a valve member 10 carrying a valve 11 and a valve 15. The valve 15 is carried in that a valve 15. The valve 10 which is at right portion of the member 10 which is at right angles to the portion mounted on the top of the valve 4. The angular portion which extends at right angles to the main axis of the valve 4 projects through the aperture 12 cut in the wheel 5 and extends to the outside of the wheel. A plate 14 is threaded on the head of this horizontal member which positions the horizontal member and its attached vertical member with respect to the wheel 5. A cap 13 is screwed on the outer end of the member 10 on the outer face of the wheel to exclude dust, etc. from the end of the member and from the valve 15. Upon the removal of this cap the air hose can be applied for the introduction of air through the valve to the tire.

On the inside of the wheel 5 in the depressed area 7 will be seen the nut 9 internally threaded to engage the thread at the end of the valve 4 and turning loosely on the member 10. This nut serves to connect 10 with 4 and to thereby position the valve in the portion of the wheel 5 at 6 and 7.

In case it is desired to remove the tire entirely the nut 9 is unscrewed from the top of 4 and then 10 is held in position and prevented from falling out of the wheel 5 by the nut 14 on one side and the vertical portion of 10 on the other side.

The plurality of valves 8, 11 and 15 serve very nicely to prevent any escape of air from the tire, which frequently occurs by reason of a leaking valve at 8. This is a double precaution which is of great value to automotive equipment employing pneumatic tires.

In case it is desired to reduce the pressure in the tire, particularly on warm days, a depression of the valve member 11 will in turn depress the projecting end of the valve 8 and allow an escape of air around 11 without disconnecting the member 10 or uncapping it at 13.

It will be observed that the valve and its co-operating parts are thoroughly protected from casual injury due to flying materials or projecting objects on the road, as these parts are retreated into the recessed portions 6 and 7 so that they lie substantially flush with the surface of the wheel.

In the prior art are disclosed disk wheels having valve extensions connected to the valve stems inside of the wheels, that is, between two disks, and therefore, it is necessary to remove one of the disks to get access to the valve stem, whereas with applicant's device the connection between the valve stem and valve extension is located exteriorly or outside of the wheel as distinguished from being located inside or between the two disks of the wheel. This feature is highly important because applicant's valve stem and valve connection can be separated without disassembling the wheel.

Having thus fully described my invention, what I claim as new and desire to secure by Letters Patent, is:—

1. In a disk wheel adapted to receive a pneumatic tire, a disk provided with a hole therethrough adapted to receive a valve connection, said disk being further provided with a depression on the inner face thereof, said depression extending from the edge of the disk toward the center of the wheel and terminating in a depressed area around said hole.

2. The combination with a disk wheel, a tire rim and a tire mounted thereon having a valve stem extending toward the center of said wheel, of a depression in said disk to accommodate said stem, said depression having an enlarged portion at the inner end thereof, a branch extension detachably connected to said valve stem at approximately right angles to the valve stem when the parts are connected, said branch adapted to pass through a hole in the depression and project from the face of the disk, and means for holding said extension in place on the disk when the extension and valve stem have been disconnected.

3. In a disk wheel adapted to receive a pneumatic tire, a disk provided with a hole therethrough adapted to receive a valve connection, said disk being further provided with a depression on the inner face thereof extending to said hole.

In testimony whereof, I affix my signature.

EUGENE J. B. GORMAN.